US009705871B2

(12) United States Patent
Engan et al.

(10) Patent No.: US 9,705,871 B2
(45) Date of Patent: Jul. 11, 2017

(54) IDENTITY AND ACCESS MANAGEMENT

(71) Applicant: T-Mobile USA, Inc., Bellevue, WA (US)

(72) Inventors: Michael Engan, Bellevue, WA (US); Steven Farsai, Redmond, WA (US); Alexandru Catalin Ionescu, Bellevue, WA (US); Brad Smith, Bothell, WA (US); Shelby Seward, Bellevue, WA (US); Christopher H. Joul, Bellevue, WA (US); Anthony Yiu, Newcastle, WA (US)

(73) Assignee: T-Mobile U.S.A., Inc, Bellevue, WA (US)

( * ) Notice: Subject to any disclaimer, the term of this patent is extended or adjusted under 35 U.S.C. 154(b) by 0 days.

(21) Appl. No.: 14/510,698

(22) Filed: Oct. 9, 2014

(65) Prior Publication Data

US 2016/0105420 A1    Apr. 14, 2016

Related U.S. Application Data

(60) Provisional application No. 61/916,122, filed on Dec. 13, 2013.

(51) Int. Cl.
*H04M 1/66* (2006.01)
*H04L 29/06* (2006.01)
*H04L 9/32* (2006.01)
*H04W 12/08* (2009.01)

(52) U.S. Cl.
CPC ........ *H04L 63/0815* (2013.01); *H04L 9/3228* (2013.01); *H04L 63/0876* (2013.01); *H04W 12/08* (2013.01)

(58) Field of Classification Search
None
See application file for complete search history.

(56) References Cited

U.S. PATENT DOCUMENTS

| 2004/0038706 | A1* | 2/2004 | Wasser | H04M 1/274566 455/551 |
| 2014/0208410 | A1* | 7/2014 | Dellago, Jr. | H04L 63/0853 726/9 |
| 2014/0282978 | A1* | 9/2014 | Lerner | H04L 63/083 726/7 |
| 2015/0249660 | A1* | 9/2015 | Bailey | H04L 67/10 726/8 |

* cited by examiner

*Primary Examiner* — Adolf Dsouza
(74) *Attorney, Agent, or Firm* — Han Santos, PLLC; Nabil Abdalla

(57) ABSTRACT

An access management account that includes an access identifier may be used to control access to telecommunications services or applications. An access identifier is designated for obtaining access to multiple telecommunications services or applications, in which the multiple telecommunications services or applications are accessible to a user through multiple user accounts that are protected by account credentials. Once the access credential is designated, the access credential may be used to determine whether access to the one or more telecommunications services or applications is to be granted instead of using the account credentials of the multiple user accounts.

20 Claims, 4 Drawing Sheets

IDENTITY AND ACCESS MANAGEMENT

CROSS REFERENCE TO RELATED PATENT APPLICATION

This patent application claims priority from U.S. Provisional Application No. 61/916,122, filed Dec. 13, 2013, which application is hereby incorporated in its entirety by reference.

BACKGROUND

Over the past thirty years, telephony has significantly evolved from the once-ubiquitous public switched telephone service (PSTN). Telecommunications consumers today have a wide range of telecommunications options to choose from, including traditional landline phone service, IP-based telecommunications services (based on, for example, Voice over Internet Protocol), cellular telecommunications services, and converged telecommunications services (such as Unlicensed Mobile Access or UMA).

Telecommunications devices now consist in a myriad of form factors, such as traditional landline phones, cordless phones, cellular phones, smart phones, personal digital assistant (PDA) phones, desktop and portable computers, media players, home telecommunications hubs, or the like (hereinafter "telecommunications devices"), which have become a ubiquitous part of modern life. Originally, most of these telecommunications devices just provided two-way voice communication between a first person at a first location using a first telecommunication device and a second person at a second location using a second telecommunication device, so that the first person and the second person were able to carry on a conversation. For example, a voice communication or call normally involved real-time, duplex, synchronous voice communications, in which all participants hear the other participants in real time, all participants can simultaneously speak, and all participants are actively engaged and respond directly and immediately to each other without significant interruption.

More recently, telecommunication devices are frequently capable of both voice and data communications, using various modes of such communications, text messages (e.g., Short Message Service or SMS), and multimedia messages (e.g., Multimedia Messaging Service or MMS) are well-known forms of asynchronous data communications. E-mail was originally used with computers, but is now commonly sent and received through telecommunications devices as well. SMS text messaging has been used for many years in the area of cellular telecommunications. Participants are typically engaged in the communications at different times, and their participation might occur as a number of small, non-contiguous, asynchronous interactions.

In addition to person-to-person communications, many modern telecommunications devices are capable of other types of data communications through access to the Internet and other databases. For example, many telecommunication devices have built-in web browsers for Internet navigation.

It should be noted that both voice and data communications might be implemented using the same wireless and IP-based technologies. In some situations, particularly with conventional cellular or IP-based systems, voice might be communicated using a proprietary cellular protocol, while data and non-voice communications are based on other protocols carried over a cellular and/or an IP-based telecommunications network.

Telecommunications devices vary in complexity and capabilities, from simple devices that support only voice communications, to very sophisticated devices with capabilities of personal computers. These very sophisticated devices may provide a variety of services to users, which may be difficult to access and manage.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
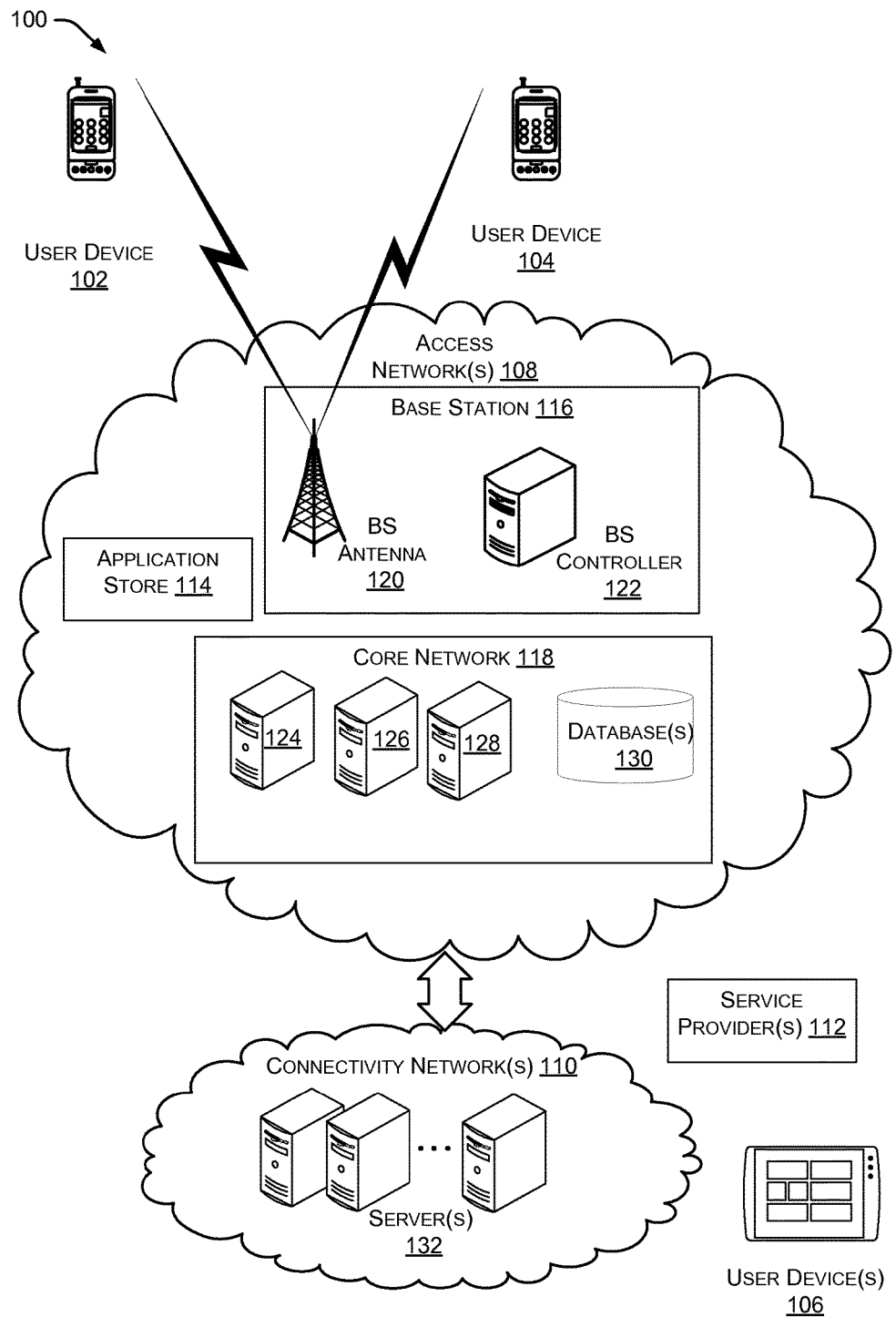
FIG. 1 illustrates an example network architecture for implementing identity and access management (IAM) on user devices.

This disclosure is directed to systems and methods for enabling user devices to access and manage services or applications provided to the user and/or to the user's device, in which the services or applications may include telecommunications services or applications.

The systems and methods described in this disclosure enable an access identifier of a user such as, but not limited to, a username, e-mail address, etc., to be associated with multiple service accounts. The association of the access identifier with multiple service accounts may enable the user to be authenticated for access to services or applications that are present on any of multiple user devices. In turn, a user device may also use access identifiers of multiple users that are associated with multiple service accounts to authenticate or host any of the multiple users. In some embodiments, service accounts may include both access network accounts and web service accounts. In some embodiments, access network accounts may include telephony network accounts (e.g., mobile station international subscriber directory number (MSISDN) accounts).

The systems and methods described in this disclosure enable an access network to provide identity and access management (IAM) accounts, each of which may be associated with multiple other accounts (e.g., non-IAM accounts), for both subscribers of the access network and for non-subscribers. For example, the non-IAM accounts may include external web accounts, social media accounts, and so forth. The IAM user may securely and seamlessly log into an IAM account in order to obtain access to services or applications accessible through the non-IAM accounts without having to provide credentials into each service or application.

In some embodiments, the IAM account may separate device identity (e.g., such as a subscriber identity module (SIM) being associated with a specific MSISDN) and user identity. For example, consider a user having certain services and/or applications, the separation between device identity and user identity may permit the user to move from one user device to another user device while still permitting the user to access the user's certain services and/or applications.

In some embodiments, an IAM system may access a user's profile and route services and/or applications based at least in part on the user's profile. While a user may sign into a new user device and have access to the user's profile, the various application settings might not be transferred.

The systems and methods described in this disclosure may enable Single Sign-On (SSO) for the multiple accounts of the user. In some embodiments, a user may be able to interact with applications on any user device (handset, tablet, web browser, Internet device (TV)) with each application transparently authenticating the user via the user's single IAM account. In some embodiments, this functionality may be used by applications written for a specific operating system (OS) (e.g., mobile device operating systems or personal computing operating systems), web browser clients, mobile web applications, and even core access network services.

The systems and methods described herein may be implemented in a number of ways. Example implementations are provided below with reference to the following figures.

Example Network Architecture

FIG. 1 illustrates an exemplary architecture 100 for implementing identity and access management on user devices such as, but not limited to, telecommunications devices (e.g. smart phones), personal digital assistants, and computing devices, which may include desktop computers, laptop computers, netbooks, tablets, etc. The exemplary architecture 100 shows, user devices 102, 104, 106, which are capable of connecting to one or more networks, as represented by access network 108 and connectivity network 110.

In some instances, the user devices 102, 104, 106 may communicate with the connectivity network 110 via wireless communication protocols such as, but not limited to, IEEE 802, which includes Wi-Fi and Bluetooth. In some instances, some of the user devices such as user device 106 may be a non-conventional communications device that may be unable to provide conventional voice/telephonic communications over a conventional wireless telephonic communications network such as a cellular network. However, such a non-conventional communications device may be able to provide voice voice/telephonic communications over an internet protocol (IP) based communications network such as the connectivity network 110.

The user devices 102-106 may be utilized to access services provided by one or more service providers 112 via applications, or apps, loaded into the user devices 102-106. The applications provided by the service providers may be categorized into multiple application levels. For example, in some embodiments, applications of a first application level may have characteristics such as being hidden from a user and being preapproved. In some instances, some or all of the applications of the first application level may be preloaded into the user devices 102-106 and such applications may provide services from an entity that controls the access network 108 and/or an entity that is affiliated with the access network 108. In some instances, some or all of the applications of the first application level may provide services that may be core to the entity that controls the access network 108 and/or an entity that is affiliated with the access network 108. In some instances, the user devices 102-106 may be configured to utilize some or all of the applications of the first application level straight out of the box. Such first level applications include hidden or background applications that may be preapproved for usage and may be utilized upon the first initialization of the user devices 102-106, and in some embodiments, such first level applications may be executed on the user devices 102-106 independent of user control, e.g., a user will not be able to turn-on or turn-off such first level applications.

In some embodiments, the user devices 102-106 may include second level applications and third level applications provided by service providers. In some instances, second level applications may include foreground or non-hidden applications, which may be preapproved for usage and may be utilized upon the first initialization of the user devices 102-106, and in some embodiments, such second level applications may be executed on the user devices 102-106 dependent on user control, e.g., a user may be able to turn-on or turn-off such second level applications. In some instances, second level applications may include applications for service providers 112 that are affiliated with the entity that controls the access network 108. For example, second level applications may include applications for services from entities such as social media entities, search entities, etc.

In some instances, third level applications may include foreground or non-hidden applications, which may not be preapproved for usage. In these instances, a user may be able to turn-on or turn-off such third level applications, and may download these third level application from one or more application stores 114 of the access network 108. In some embodiments, the user will grant these third level applications access to the IAM account of the user for managing access to these third level applications after confirming the identities and/or functionalities of these third level applications.

In some embodiments, the application stores 114 may store first through third level applications for download to the user devices 102-106. Service providers 112 may provide their applications to the application stores 114 for review and approval. Application of any level may be provided to the user devices 102-106 via download channels, such as directly from a web site or within a web browser, as an alternative to being pre-installed as software on the users devices 102-106. While applications are discussed in the foregoing examples as having three application levels, applications may also be organized into any arbitrary number of multiple levels in other instances, in which the applications of each level may have different permission or user control characteristics. Accordingly, as further described below, factors such as permissions that users may have granted to the applications of different application levels, and/or other factors such as identities of users that have been authenticated on the user devices, device authentications of user devices, the types of the user devices, etc. may be used to determine different services that are granted to different applications on the user devices.

The user devices 102-106 are configured to provide device-independent services to a user via a unique user identifier stored in the user's IAM account. A user may log into one or more of the user devices 102-106 by providing the unique user identifier and a credential such as, but not limited to, biometric information (finger print, retina scan, etc.), password, etc. The access network 108 may then route services to the one or more user devices 102-106 at which the user has logged into.

The user of a user device may also choose to connect the device identifier of a user device to the IAM account of the user. In other words, the device identifier may function as an access identifier for the user in obtaining access to services on the user device. The device identifier may include any information that uniquely identifies the user device. For example, the device identifier of the user device may be, but not limited to, a token assigned to the user device, a SIM secret, authentication and key agreement (AKA) authentication data, generic bootstrap architecture (GBA) authentication data, or other cellular, radio, or Wi-Fi enabled device authentication data. In one instance, the user of the user device may connect the device identifier of the user device to the IAM account of the user via a configuration setting on the user device, such as a "remember me on this device" option. Such connection of the device identifier with the IAM account of the user may provide multiple benefits. For example, the device identifier of a user device may be connected with the IAM account of the user when the user initially obtains access to the user device using the user identifier. Once connected, the user is freed from having to log onto the user device to use applications or services available through the user device, even after the user device is reset to a factory setting.

In the example in which the SIM secret stored on a SIM card is connected with the access identifier in the user's IAM account, a service provider may send the SIM card to the user after the user loses a user device. Once the user inserts the SIM card into a replacement user device, the user may be automatically granted access to services or applications provided by the service provider via the replacement user device without having to enter any login information. This is because the service provider may be assured that the replacement user device belongs to the user based on the connected SIM secret. However, the user devices in the foregoing examples may also provide a configuration setting in which the user may override the connection between the device identifier and IAM account of the user, such that the user may be free to login using alternative login credentials.

In some embodiments, multiple users may be concurrently logged into the same user device 102-106. For example, two different users may be logged into the user device 102 and services for both of the users may be concurrently routed to the user device 102. As one non-limiting example, a couple such as a husband and wife may be concurrently logged into the user device 102, and the user device 102 may be a telecommunications device having a unique identifier such as an International Mobile Subscriber Identity (IMSI) identifier. The husband may have his own telephone number (e.g., 123-555-1234) and the wife have her own telephone number (e.g., 123-555-5678). When both the husband and wife are currently logged into the user device 102, the access network 108 routes telephone calls for the husband's telephone number and for the wife's telephone number to the user device 102.

As described in detail below, the access network 108 is not "forwarding" telephone calls for the husband's telephone number to his wife's telephone or vice-versa. Rather, the access network 108 is routing telephone calls for multiple different telephone numbers to a single user device 102 based at least in part on user profiles.

The access network 108 is representative of any one or combination of multiple different types of networks, interconnected with each other and functioning as a single large network (e.g., circuit-switched telephone networks or IP-based packet-switch networks). The access network 108 may also include wire-based networks (e.g., PSTN, IP-based, etc.) and wireless networks (e.g., cellular, satellite, IP-based, etc.).

The access network 108 may provide, among other things, wireless connectivity with the user devices 102, 104 and may use any number of protocols and configurations to enable the user devices 102, 104 to access other devices and resources. The access network 108 may include several types of circuit-switched telephone networks, such as Public Switched Telephone Network (PSTN) and packet-switched networks, such as the Internet. For example, the access network 108 may include a Global System for Mobile Communication (GSM) network, a Code Division Multiple Access (CDMA) network, an Enhanced Data Rates for GSM Evolution (EDGE) network, a Universal Telecommunications System (UMTS) network and/or other types of circuit-switched networks, a Long Term Evolution (LTE) network, a Worldwide Interoperability for Microwave Access (WiMAX) network, the Internet, and/or other packet-switched networks. The access network 108 may also include private networks such as a mobile telephone operator's networks which may use proprietary systems or protocols that are different from the systems or protocols implemented on public networks.

In the case of wireless networks, the access network 108 may include one or more base stations 116 and a core network 118. Each base station 116 may include a base station antenna 120 and a base station controller or radio network controller 122 (referred to herein as "base station controller 122").

The core network 118 may include one or more serving gateways 124, one or more access network gateways (AN-Gateways) 126, one or more identity and access management (IAM) controller 128, and one or more databases 130. The databases 130 may include home location registers, visitor location registers, policy and billing databases, and user profiles. Each of the IAM accounts managed by the IAM controller 128 may be connected with multiple home location registers. The databases 130 may store multiple mobile telecommunication network carrier subscription identifiers, such as multiple MSISDNs, for each user. For example, the databases 130 may store, for a user that uses multiple mobile telecommunication networks, MSISDNs from multiple carriers that serve overlapping and/or non-overlapping geographical areas. In some embodiments, some or all of the communications internal to the core network 118 may be carried by telecommunications protocols such as, but not limited to, Signaling System 7 (SS7).

The serving gateway 124 may handle communications with the base station 116 and/or with the user devices 102 and 104. In some embodiments, the serving gateway 124 may interface with public switched telephone service networks (not shown). In some embodiments, the serving gateway 124 may be a serving GPRS support node. GPRS is the general packet radio service for the global system for mobile communications (GSM).

The AN-Gateway 126 may, among other things, provide and establish connectivity with the connectivity network 110 and the user devices 102-106. In some embodiments, the AN-Gateway 126 may be a gateway GPRS support node.

The connectivity network 110 may be responsible for establishing connectivity with an IP backbone and may include one or more servers 132. Servers 132 may include Dynamic Host Configuration Protocol (DHCP) servers, Domain Name System (DNS) servers, and Authentication, Authorization, and Accounting (AAA) servers. The service providers 112 may provide services to the user devices 102-106 via the connectivity network 110.

The IAM controller 128 may receive user device identifier information from the user devices 102-106, and use such device identifier information to provide user access to services or applications available via the user devices 102-106. For example, when a user launches a service on the user device 102, the application that is providing the service may request that the IAM controller 128 authenticate whether the user is authorized to use the service via the user device 102. The application that is providing the service may reside on the user device 102 or on a server of a service provider. In some instances, the application may send the device identifier of the user device to the IAM controller 128 as a part of the request. In such instances, if the device identifier of the user device is connected to an access identifier stored in the IAM account of a user, the IAM controller 128 may automatically grant the user access to the application that is providing the service. Once the user granted access to the application, the application may retrieve, from the databases 130, a user profile corresponding to the user. The IAM controller 128 may update the user profile to indicate that the user is logged into the application, so that a service provider may route services to the user device 102 based at least in part on the user profile. The service provider may provide services such as route voice calls, provide access to data, direct data traffic, etc. For example, a user may launch a telecommunication application on the user device 102. The telecommunications application may contact the IP multimedia subsystem (IMS) of a telecommunication service provider. The IMS may use the IAM controller 128 to identify the user that is using the user device 102. Once the user is identified as the user of the user device 102, the IMS may access the user profile of the user, and route subsequent telephone calls for the user to the telecommunications application on the user device 102 based on the user profile.

However, in alternative embodiments, the IAM controller 128 may request that the user provide IAM account login credentials from the user if no connected device identifier is available or is otherwise not received by the IAM controller 128. Accordingly, if the user is able to correctly supply the IAM account login credentials to the IAM controller 128, the IAM controller may grant the user access to the application that is providing the service. Subsequently, the application may retrieve the user profile corresponding to the user from the databases 130 for configuring the service in the same manner as described above.

In some instances, the IAM controller 128 may filter the user profile and provide a portion of the user profile to the service providers 112 and/or applications on the user devices 102-106. The IAM controller 128 may filter the user profile based on a variety of factors such as, but not limited to, the permissions granted to the service provider 112 or applications requesting data from the user devices 102106. This means that, for instance, one application on a user device which is a first level application may have access to a complete user profile, while another application of a lower level on the same user device may have access to only a small part of the user profile. In this way, both the user's approval for an application or service provider to access the user profile of the user, and the IAM configuration may determine how much user data is available to the application or the service provider.

In some embodiments, the IAM controller 128 may auto populate aspects of a user profile based at least in part on user information stored in the databases 130. For example, the databases 130 may include home location registers, visitor location registers, policy, and billing databases for customers of the access network 108. The IAM controller 128 may mine the databases 130 to populate portions of a user's corresponding user profile. Alternatively or concurrently, the IAM controller 128 may use data collection agents, e.g., data mining applications, on the user devices 102-106 to obtain additional user information regarding the users. These data collection agents may perform such a function after obtaining the consent of the users. For example, a data collection agent on a user device may display a prompt to a user requesting permission to collect user information (e.g., e-mail addresses, user login names, passwords, etc.) on an ongoing basis. In this way, the user has the option of accepting or declining the data collection. If a user accepts data collection at a user device, the IAM controller 128 may store the collected user information in a corresponding user profile in the databases 130. The collected user information of a user may be used by the IAM controller 128 to provide additional convenience to the user during device usage. For example, the IAM controller 128 may auto populate a user identifier field of a user authentication interface as displayed by an application that is initiated with a user identifier (e.g., e-mail address). In this way, the user may skip the input of the user identifier, and instead simply input a password or personal identification number (PIN) to access a service provided via the application.

Example Base Identification and Access Management Controller

Figure 2:
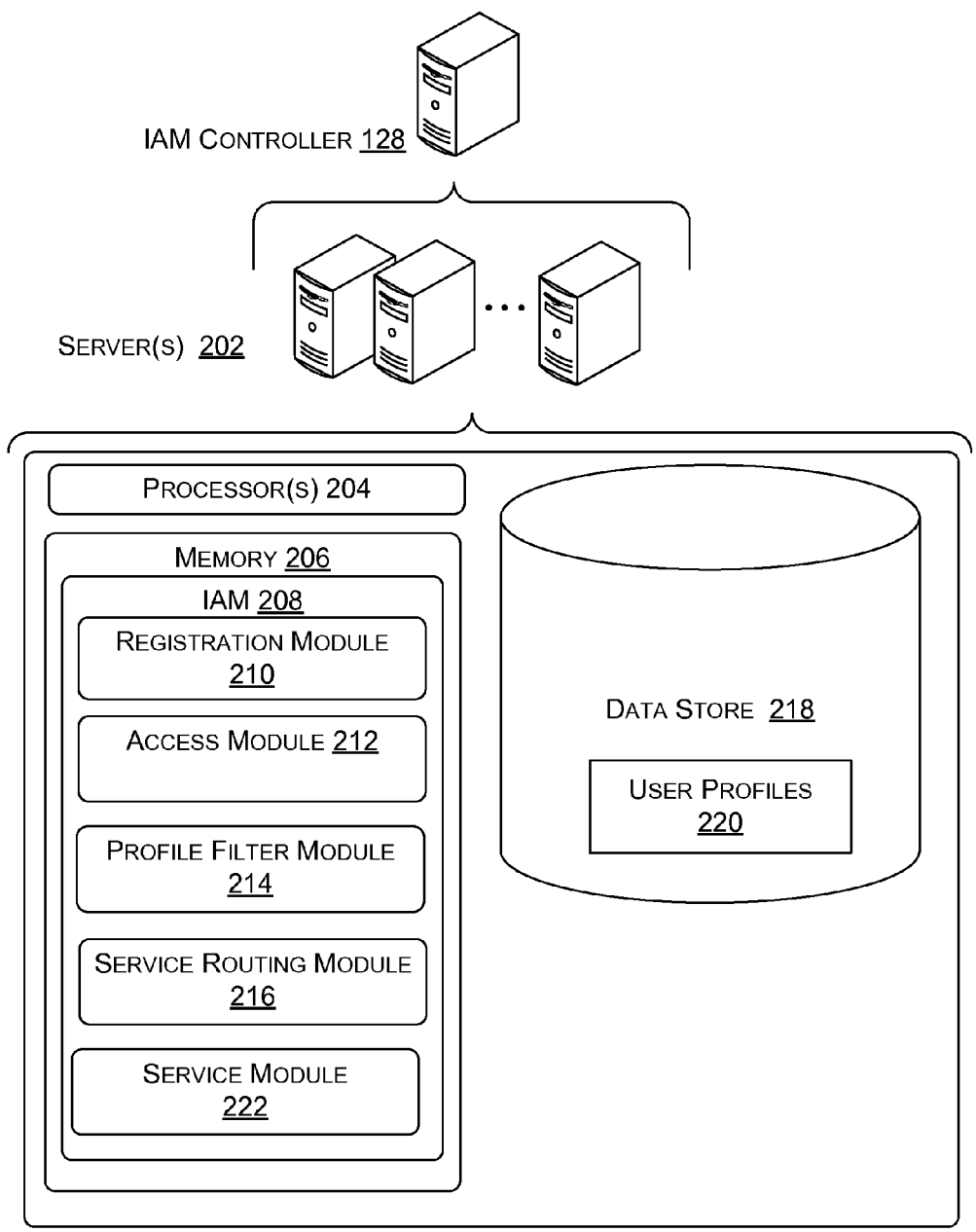
FIG. 2 is a block diagram showing various components of an illustrative IAM controller shown in FIG. 1.

FIG. 2 shows an example IAM controller 128 such as might be used in conjunction with the techniques described here. The IAM controller 128 may implement one or more protocols, with a corresponding IAM client on the user devices 102-106, to identify the user devices 102-106 and/or applications and manage access by the user devices 102-106. In some embodiments, the IAM controller 128 may implement protocols for delegated/redirected authentication such as, but not limited to, OAuth, OAuth 2.0, Open ID Connect, SAML, etc. (For the purposes of this description, OAuth shall refer to OAuth, OAuth 2.0, and OpenID Connect.) In some embodiments, the IAM controller 128 may implement protocols for authentication via a shared secret such as, but not limited to, generic bootstrapping architecture (GBA). In some embodiments, the IAM controller 128 may implement protocols for delegated authentication and authentication via a shared secret. For example, the delegated authentication may be authentication performed by a third party social network.

The IAM controller 128 may include one or more servers 202 that include processors(s) 204 and memory 206. The memory 206 may include volatile memory (such as RAM), nonvolatile memory, removable memory, and/or non-removable memory, implemented in any method or technology for storage of information. Also, a processor may include onboard memory in addition to or instead of the memory 206. Some examples of computer-readable storage media which may be included in the memory, and/or processor include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information.

The memory 206 may store various modules, applications, programs, or other data. The memory 206 may include instructions that, when executed by the processor(s) 204, cause the processors to perform the operations described herein for the IAM controller 128. In some embodiments, the memory 206 may store an identity and access management (IAM) application 208. The IAM application 208 may include a number of modules that perform some or all of the various operations described herein. In accordance with various embodiments, the IAM application 208 may include some or all of the following modules: a registration module 210, an access module 212, a profile filter module 214, and a service routing module 216.

In addition, the servers 202 may include data store 218 for storing user profiles 220. A user profile 220 may include a corresponding user identifier, a telephone number, a user name (which may be the user's actual name), a display name (which may be different from the user's actual name), e-mail address, messaging identifier (e.g., short messaging system (SMS) PIN), name of billing entity, login information for a variety of services provided by the service providers 112 (e.g., user names and credentials for social media web sites), identifying information (e.g., date of birth, current address, previous address, answers to security questions), registered device identifiers, etc.

In some embodiments, the user identifier may be unique to the access network 108 and may be the user's telephone number, the user's user name, the user's actual name, the user's user name, the user's user name e-mail address, etc.

The registration module 210 may register a user device 102-106 for receiving services from the access network 108. The registration module 210 may, in some instances, mine the databases 130 or collect data directly from users via data collection agents on the user devices 102-106 to populate fields of user profiles. In some instances, one or more user profiles may be at least partially completed before a user makes a first attempt to register a user device 102-106. For example, the registration module 210 may mine policy and billing databases for customers of the access network 108 to retrieve actual names of customers and corresponding telephone numbers, mobile station international subscriber directory numbers (MSISDNs), addresses, date of birth, current address, previous address, answers to security questions, etc. In some instances, the registration module 210 may prompt a user for information and complete the user's user profile. For example, the registration module 210 may request an e-mail address for the user and, in some instances, may verify a purported e-mail address by sending confirmation information to the purported e-mail address and requesting the user to enter the confirmation information.

The access module 212 may process access requests from service providers 112 or applications on the user devices 102-106 and may grant or deny such requests. In some embodiments, the access module 212 may deny access requests based at least on the corresponding user profile. For example, the access module 212 may deny access requests if the user has not accepted "terms of service." The access module 212 may determine permissions or scope of permissions to be granted to the service provider 112 or applications on the user devices 102-106. The access module 212 may provide risk analysis for login requests. For example, access module 212 may provide security questions, secret PINs, CAPTCHAs, and login reminders after a user has failed to successfully login to the access network a predetermined, consecutive number of times, or if the access module 212 determines that some aspect of the user session may be classified as having risk, such as being a first time that a user logs in on a new user device. In some embodiments, the access module 212 may automatically populate some information into the user authentication interfaces displayed to the user based on the user profile of the user. The access module 212 may provide tokens, which may grant a user access to a service provider 112 without an exchange credentials with the service provider 112.

In some instances, the access module 212 may update a user profile 220 in response to an access request. For example, a user may login to the access network 108 with a specific user device, e.g. user device 102, and the access module 212 may update the user's corresponding user profile 220 to reflect that the user is logged into the user device 102. Once the user profile 220 is updated, the access module 212 may use the updated user profile 220 to grant the user access to other services or applications that are available through the user device 102.

The profile filter module 214 may filter a user profile based on a number of factors such as, but not limited to, exposure the user has consented to, data that is allowed to be exposed to applications via the stored IAM configuration, the user device 102-106 from which a request was made, the service being requested, the service provider 112 for the corresponding service, etc. The access module 212 may provide cookies and tokens based at least in part on the filtered user profile. In some embodiments, the IAM controller 128 may revoke cookies and/or tokens provided to the user devices 102-106.

The service routing module 216 may route services from the service providers 112 to users based on the corresponding user profiles 220 of the users and may route services of the access network 108 based on the corresponding user profiles 220. For example, the service routing module 216 may check the user profiles 220 to determine which user device (or user devices) a user is logged into and route services to that user device (or those user devices).

The IAM application 208 may also include a service module 222. The service module 222 may provide services to the user devices 102-106. The service module 222 may provide an interface that a user utilizes to interact with IAM controller 128. For example, the service module 222 may include web agents 224 for providing web pages to the user devices 102-106. In some instances, the web pages provided to the user devices 102-106 may include full web pages 226, which may be displayed at user devices 102-106 as a page, pop-up web pages 228, which may be displayed as pop-up web pages, and mobile device web pages 230, which may be web pages optimized for display on mobile devices and may be displayed as part of a graphical user interface for receiving user touch input. The user device 102-106 may function as agents of the service module 222 and may provide browsers that may display content (e.g., web pages) from the service module 222.

Although the IAM controller 128 has been illustrated and described in the context of a separate server such description is non-limiting. In some embodiments, the IAM controller 128 may reside in the serving gateway 124 including in a serving GPRS support node. In some embodiments, the IAM controller 128 may reside in a network appliance of the access network 108.

User Devices

Figure 3:
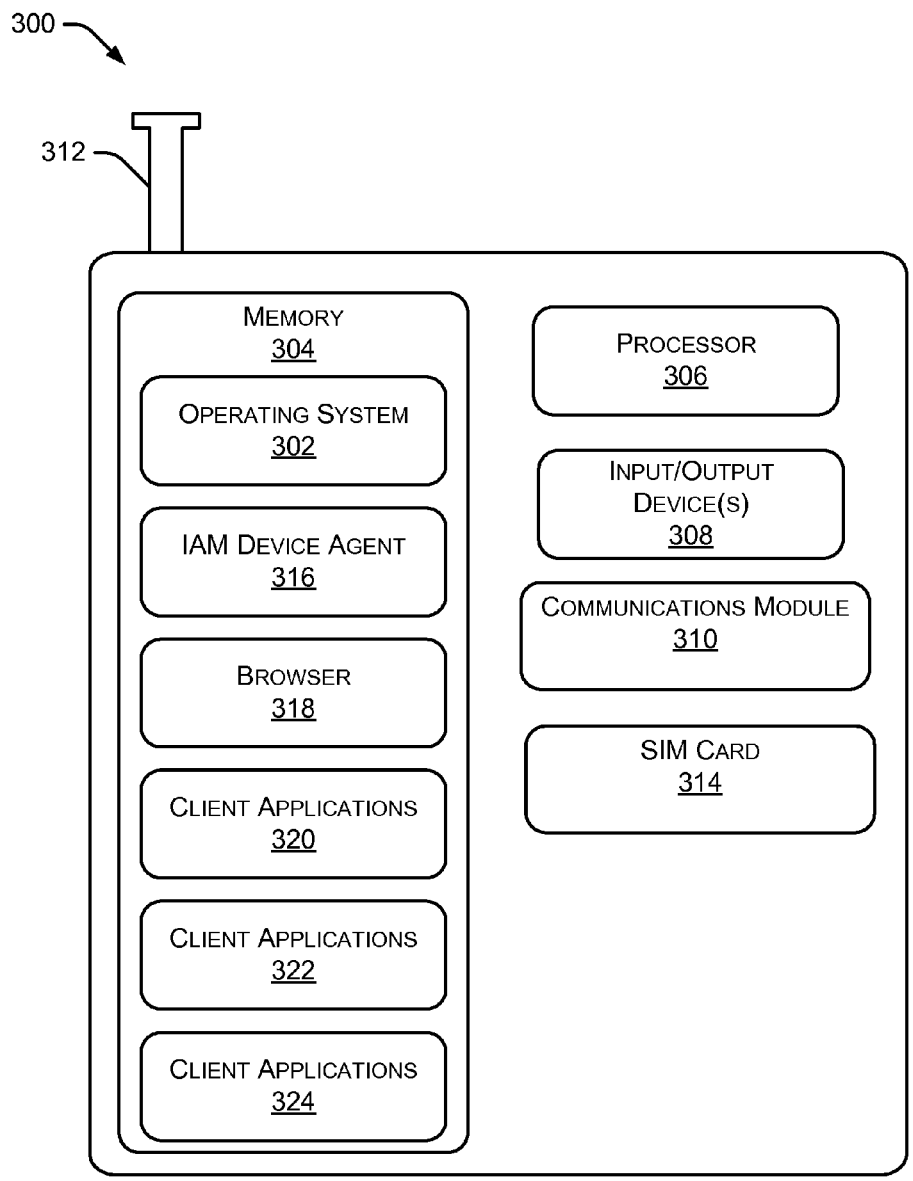
FIG. 3 is a block diagram showing various components of an illustrative user device.

FIG. 3 shows a user device 300 such as might be used in conjunction with the techniques described here. In many cases, user device 300 may be what is commonly referred to as a "cell phone" or "smart phone," although the described techniques are not limited to such telecommunications devices.

The user device 300 typically has an operating system 302 executed from some form of solid-state memory 304 by one or more processors 306. Custom software may be preloaded onto the device to perform various functions and to support the different communication modes. Many user devices allow the user to customize the user device through configuration options or by adding third-party software. Such software is available for many different functions, not limited to communications, and, in some instances, may be downloaded via the application stores 114.

The user interfaces of telecommunications devices vary widely. The user interfaces include input/output devices 308. The most basic input/output devices 308 might include a numeric telephone-type keypad, to which has been added "talk" and "end" buttons for controlling voice calls, and a basic output device consisting of a single-line display for indicating telephone numbers. Other input/output devices 308 might include touch-screen interfaces, alpha-numeric keypads, a microphone, and other forms of input devices. Input/output devices 308 may also include display screens, speakers, and other forms of output devices.

The user device 300 may include communications module 310 and an antenna 312, which receives and transmits radio frequency signals. In some embodiments, the communications module 310 may include circuitry and logic that provides signal processing including modulation and demodulation such as, but not limited to, binary phase shift keyed (BPSK), quadrature phase shift keyed (QPSK), and quadrature amplitude modulation (QAM). In some embodiments, the communications module 310 may include circuitry and logic for communications over unlicensed spectrum, such as a wireless point-to-point communications network (e.g., a Wireless Fidelity (Wi-Fi) (IEEE 802.11) network and/or a Bluetooth (IEEE 802) network).

The user device 300 may also include a subscriber identity module (SIM) card 314. The SIM card 314 may be configured to provide shared secret authentication. In some instances, the SIM card 314 may be configured to utilize GBA for authentication of the user device 300.

The memory 304 may include an IAM device agent 316, a browser 318, and client applications 320-324. The IAM device agent 316 may cooperate with the IAM controller 128 to provide identification and access management to services of the access network and/or the service providers 112. The browser 318 may provide a graphical user interface for displaying hypertext mark-up language (HTML) files or web pages and may be used to navigate the World Wide Web (WWW). The client applications 320 may include applications from one or more sources such as, but not limited to, an entity that controls the access network 108 and entities affiliated with the access network 108.

The client applications 320-324 may be utilized to, among other things, access services of the access network 108 and/or the service providers 112. Client applications 320, 322, and 324 may be first, second, or third level applications, respectively. In some instances, the first level client applications 320 and the second level client applications 322, and the third level client applications 324, may be preloaded onto the user device 300. In some instances, the first level client applications 320 and the second level client applications 322, and the third level applications 324 may have been downloaded by the user to the user device 300 from the application stores 114. The first level client applications 320, which were preloaded onto the user device 300, may be pre-approved for utilizing services of the access network 108 such that these preloaded applications are ready for utilization the first time the user device 300 is used by a user. The first level client applications 320 may include applications that are hidden from the user. Applications that are hidden from the user may include applications that are not visible to the user of the user device 300 but nevertheless perform functions on the user device 300. Alternatively or concurrently, applications that are hidden from the user may include application that are visible to the user on the user device 300, but for which the user has no control over approving or revoking their abilities to perform functions. In other words, the first level client applications 320 may include applications that are independent of user control, e.g., a user may not be able to turn-on or turn-off such first level applications.

The second level client applications 322 may include foreground or non-hidden applications, which may be pre-approved for usage and may be utilized upon the first initialization of the user devices 300. In some embodiments, such second level client applications 322 may be executed on the user device 300 responsive to user control, e.g., a user may be able to turn-on or turn-off the second level client applications 322. In some instances, the second level client applications 322 may include applications for service providers 112 that are affiliated with the entity that controls the access network 108. For example, second level client applications 322 may include applications for services from entities such as social media entities, search entities, etc.

As stated above, the client applications 324 may be third level applications. The third level applications may be pre-loaded or downloaded onto the user device 300. The third level applications are not able to access the user profile data of a user that is managed by the IAM controller 128 unless the use grants the third level applications permission to do so. For example, a third level application that is providing a service to the user may be a third-party application that is preloaded on the user device 300. The third-party application may want to access the user profile of the user that is stored in the databases 130. However, the third-party application is required to obtain access permission from the user before such access is granted.

The IAM device agent 316 may be configured to provide identification and access management utilizing delegated/redirected authentication and/or shared secrets. In some instances, the IAM device agent 316 may utilize GBA protocol for registration and/or authentication of the user device 300 with the IAM controller 128. In some embodiments, the IAM device client may calculate a secret based at least in part on a signature of a client application 320-324 and may calculate an indicator of the secret such as, but not limited to, a hash of the secret. In some embodiments, the secret and the indicator of the secret are not stored at the user device 300. Rather, the secret and/or the indicator of the secret may be calculated as needed by the user device 300.

In some embodiments, the IAM device agent 316 enables a user to sign in, manage identity, approve applications, and in some instances, the IAM device agent 316 may provide SSO features to multiple device applications. In some embodiments, the IAM device agent 316 may be a device specific library that enables applications to communicate to the IAM controller 128 with GBA features via a browser controller 326 that uses web pages provided by the IAM web agents 224. The IAM device agent 316 and the IAM web agents 224 may be entry point(s) for client applications 320-324.

The IAM device agent 316 may provide a request for a service to the IAM controller 128. In various embodiments, the IAM device agent 316 may initiate the request on behalf of a client application, such as the client applications 320-324. For example, the a client application may prompt the IAM device agent 316 to initiate the request by passing a command to the IAM device agent 316 with input data (e.g., an access identifier of the user) for the IAM controller 128. The request may include, among other things, the calculated secret or the indicator of the secret, an application identifier that identifies a client application of the client application 320-324, a device identifier of a user device, request scope (which may be a list of permissions requested by the client application) to the IAM controller 128 for authentication of the user device 300 and/or authentication of the corresponding client application 320-324. The request may also include, among other things: a request type, which identifies a code/token being requested; display, which may indicate a type of web page to be displayed (e.g., full web page, pop-up web page, mobile device web page) or no web page; session identifier for identifying a session of a service being requested; requests for refresh tokens, requests for forced reauthorization of the user device 300; requests for the user of the user device 300 to re-accept the list of requested permissions, even if the permissions are already approved; and a redirect address such as a uniform resource identifier (URI), which may be an address for the requested service. In some instances, the display request for no web page may be utilized when there is no interaction between an application and a user. This gives the application the ability to get an access token if the user is signed in and has approved the application, or receive an error if user interaction is needed.

In response to the request, the IAM controller 128 may provide a response for authorizing (or denying) the user device access to the requested service. The response may include, among other things: a response type indicator indicative of whether the response includes a token, code, or error; an error message; a token, which may be included in a URI; list of granted permissions; and a refresh token, if such was requested and authorized. The response may also include information like the level of Assurance (LOA) the user has achieved, and what methods of authentication may have been used.

In some embodiments, the IAM device agent 316 (and the IAM controller 128) may be configured to provide SSO of the client applications 320-324. In some instances, cookies and/or tokens 328 may be provided to the IAM device agent 316 for, among other things, facilitating SSO functionality of the client applications 320-324. In some embodiments, the cookies and/or tokens 328 may be accessible by the IAM device agent 316 and, in some instances, are not shared with the client applications 320-324. In some embodiments, a first set of cookies and/or tokens may be shared by a first set of multiple client applications 320-324, and a second set of cookies and/or tokens may be shared by a second set of multiple client applications 320-324. The cookies and/or tokens 328 may include authentication cookies and/or tokens that indicates that a user account has been successfully authenticated. In some instances, cookies and/or tokens 328 may include authentication cookies/tokens that are issued with a long lived expiration date. In some embodiments, a cookie and/or token 328 with a long lived expiration date may be provided in response to user input, e.g., a user selecting a "keep me logged in" option.

In some embodiments, the cookies and/or tokens 328 may include, among other things, authentication code tokens, access tokens, and refresh tokens. Authentication code tokens may have a short duration lifetime, may indicate that a user has been authenticated and that the user has authorized a specific client ID (e.g., an application identifier of a specific client application of the client applications 320-324) to a scope requested, and may be utilized to request access tokens. In various embodiments, the application identifier may be a signature of the application or a secret that is calculated from the signature of the application.

Access tokens may be used to access a resource server such as the IAM controller 128 or other services from service providers 112. In some instances, an access token may be utilized to access the IAM controller 128 at launch of a client application 320-324. Access tokens may have a duration, and in some embodiments, the duration may be configurable per client ID. Access tokens may be issued for a specific IAM user to a specific scope, for a specific duration.

Refresh tokens may be utilized for offline access mode and may be issued when requested and/or when a client ID is configured. Refresh tokens may allow an IAM client application of the client applications 320-324 to refresh the access token without a user having to open a session.

In some instances, the IAM controller 128 may not issue cookies and or tokens for a client application 320-324 that has been configured as a mobile device application unless the IAM device agent 316 requests such cookies and/or tokens.

In some embodiments, a client application 320-324 may include an IAM helper library, which may communicate with the operating system 302 and the IAM device agent 316. The IAM helper library may access the IAM device agent 316 by accessing the operating system 302. For example, the operating system may include an account and synchronization module for managing and synchronizing user accounts. The IAM device agent 316 may respond to requests from IAM helper libraries that wish to get a cookie and/or token (e.g., an access token and/or authentication code token). In the event an access token is requested the IAM device agent 316 may take the additional steps to retrieve the client's signature. The IAM device agent 316 may provide a service plugin to the operating system 302. The service plugin may make a services of the access network 108 available as a standard account.

In some embodiments, the IAM device agent 316 may have an interface to the web agents 224 to preform token requests. In some instances, the IAM device agent 316 may make requests as directed by a user or the client applications 320-324 to invalidate tokens or cookies that are issued to a user device 300. In some instances, the invalidation may include invalidating the current token or cookie, any token or cookie issued to the user device 300, or every token or cookie ever issued for a user of the user device 300. These transactions may be GBA enriched. In some embodiments, IAM device agent 316 may embed GBA supported headers in all HTML traffic to the IAM controller 128. The IAM device agent 316 may also function as a data collection agent on the user device 300 to gather data regarding a user for storage in a corresponding user profile.

Example Process

Figure 4:
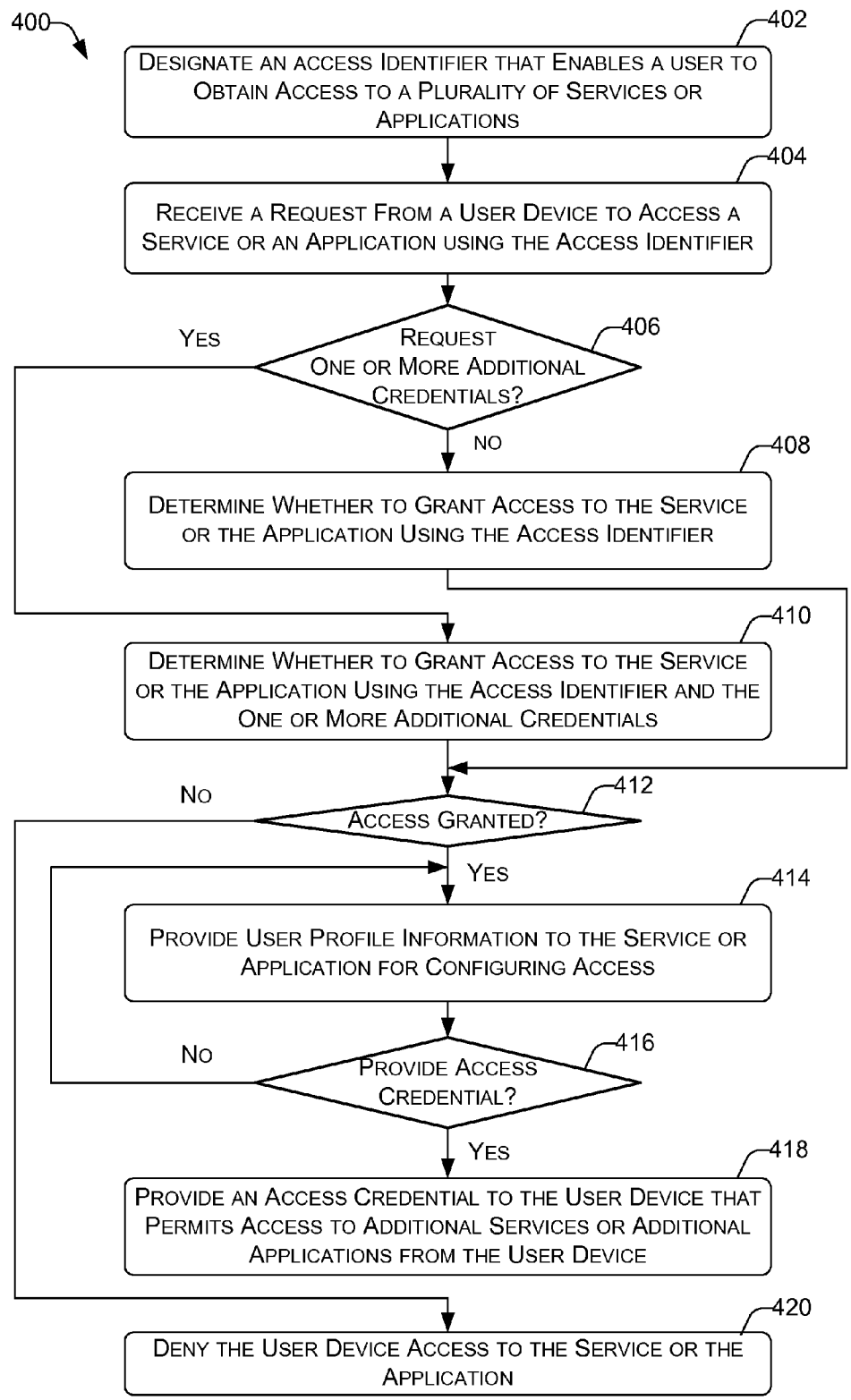
FIG. 4 is a flow diagram of an example process for using an access identifier of an IAM account to control access to services or applications.

FIG. 4 is a flow diagram of an example process for using an access identifier of an IAM account to control access to services or applications. For discussion purposes, the process 400 is described with reference to the IAM controller 128 of FIGS. 1 and 2. Processes discusses herein are illustrated as a collection of referenced acts arranged in a logical flow graph, which represent a sequence that can be implemented in hardware, software, or a combination thereof. In the context of software, the acts represent computer-executable instructions that, when executed by one or more processors, perform the recited operations. Generally, computer-executable instructions include routines, programs, objects, components, data structures, and the like that perform particular functions or implement particular abstract data types. The order in which the acts are described is not intended to be construed as a limitation, and any number of the described acts can be combined in any order and/or in parallel to implement the process.

At 402, the IAM controller 128 may designate an access identifier that enables a user to obtain access to a plurality of services or application. In various embodiments, the IAM controller 128 may designate the access credential based on inputs of a user at a user device, such as the user device 300. An IAM agent 316 on the user device may provide the inputs to the IAM controller 128 via a connectivity network, such as the connectivity network 110. The access identifier may be a user identifier, a device identifier, an application identifier, or some other identifier that the user established in an IAM account with the IAM controller 128.

At 404, the IAM controller 128 may receive a request from the user device to access a service or an application using the access identifier. The application may be an application that resides on the user device. The service may be a service that is provided by a service provider, such as the service provider 112, through a connectivity network. In some instances, a service that is provided through a service provider may be reached through an application installed on the user device. In various embodiments, a user may have previously established user accounts with account credentials to use services or applications. Accordingly, the services or the applications may be alternatively accessible to the user via the account credentials that are inputted into the applications or provided to the service providers. However, in such embodiments, the services or the applications may be configured to rely on the validation of the user identifier by the IAM controller 128, instead of the validation of the account credentials by the applications or the service providers, to determine whether access is to be granted to the services or the applications.

At decision 406, the IAM controller 128 may decide whether to request one or more additional credentials, in addition to the access identifier, in order to grant the user device access to the service or the application. In various embodiments, the IAM controller 406 may make such a determination based on an analysis of the risks associated with the user request, settings in the user profile for the IAM account that is associated with the provided access identifier, the type of the provided access identifier, a security level of the application or the service, and/or so forth. Accordingly, if the IAM controller 128 decides that one or more additional credentials is not necessary, the process 400 may proceed to 408.

At 408, the IAM controller 128 may determine whether to grant access to the service or the application using the access identifier. In other words, the IAM controller 128 may perform validation of the access identifier. Accordingly, the IAM controller 218 may grant access to the application or the service when the access identifier is validated. In some instances, rather than performing the validation, the IAM controller 128 may send the access identifier to a third-party authentication service in order to perform delegated authentication.

However, returning to decision 406, if the IAM controller 128 decides to request the one or more additional credentials, the process 400 may proceed to 410. At 410, the IAM controller 128 may request one or more additional credentials from the user device. In some embodiments, the user device may automatically provide the one or more additional credentials (e.g., a calculated secret, a shared secret, a password, etc.) to the IAM controller 128 via the IAM device agent 316 on the user device. In other embodiments, the IAM device agent 316 on the user device may request the one or more additional credentials on behalf of the IAM controller 128. The one or more obtained credentials are then transmitted by the IAM device agent 316 to the IAM controller 128. In turn, the IAM controller 128 may determine whether to grant access to the service or the application using the access identifier and the one or more additional credentials. In other words, the IAM controller 128 may perform validation of the access identifier and the one or more additional credentials. Accordingly, the IAM controller 218 may grant access to the application or the service when the access identifier and the additional credentials are validated. In some instances, rather than performing the validation, the IAM controller 128 may send the access identifier and the one or more additional credentials to a third-party authentication service in order to perform delegated authentication.

At decision 412, if the IAM controller 218 decides to grant access to the application or the service, the process 400 may proceed to block 414. At block 414, the IAM controller 218 may provide the user device with access to the application or the service. In various embodiments, the IAM controller 218 may provide the service or the application with access to user profile information that is stored in the IAM account of the user, such that the application or the service may configure the appropriate extent of access for the user device. In some embodiments, the amount of use profile information that is provided to an application on the user device may be dependent on a level of the application.

At decision 416, the IAM controller 218 may determine whether to provide an access credential to the user device. The access credential may be a credential that permits the user device to access additional services or additional applications from the user device. Accordingly, if the IAM controller 416 decides to provide the access credential to the user device, the process 400 may proceed to 418. At 418, the IAM controller 218 may provide the access credential to the user device. In various embodiments, the access credential may be in the form of a token or a cookie that is stored on the user device. Subsequently, the user device may use the access credential to access the additional services or additional applications.

However, returning to decision 416, if the IAM controller 218 determines that the access credential is not to be provided to the user device, the process 400 may loop back to 414. Further, returning to decision 412, if the IAM controller 218 decides to not grant access to the application or the service, the process 400 may proceed to block 420. The IAM controller 218 may deny access if the IAM controller 218 is unable to validate the supplied access identifier, or unable to validate a combination of the supplied access identifier and additional credentials, dependent on whether additional credentials were requested. At block 420, the IAM controller 218 may deny the user device access to the service or the application.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of providing access to services via a communications network, comprising:
receiving, a request to access at least one telecommunications service or application at a user device, the request including a user device identifier that has been assigned to the user device by a wireless access network that provides cellular communication services to multiple user devices, the at least one telecommunications service or application being accessible through at least one user account that is protected by account credentials;
determining that the user device identifier is associated with an access identifier stored in an access management account at the wireless access network, the access identifier providing access to the at least one telecommunications service or application via the at least one user account, the access identifier being different from the account credentials of the at least one user account; and determining whether to grant access to the at least one telecommunications service or application at the user device based on the access identifier.

2. The method of claim 1, further comprising:

accessing a portion of a user profile associated with the user device following a determination that the user device is granted access to the at least one telecommunications service or application, the portion of the user profile being less than an entirety of the user profile; and providing the at least one telecommunications service or application with access to the portion of the user profile.

3. The method of claim 2, wherein determining that the portion of the user profile is accessible by the at least one telecommunications service or application is based at least in part on permissions associated with the access identifier or permissions associated with the at least one telecommunications service or application.

4. The method of claim 1, further comprising updating a user profile associated with the user device to indicate that the user is logged in on the user device such that the user device is able to access the at least one a plurality of telecommunications service services or application applications via the user device.

5. The method of claim 1, further comprising routing telephone calls to the user device based at least in part on a determination that the user device is granted access to the at least one telecommunications service or application.

6. The method of claim 1, wherein the user device-identifier includes one of a token assigned to the user device, a subscriber identity module (SIM) secret, authentication and key agreement (AKA) authentication data, or generic bootstrap architecture (GBA) authentication data.

7. The method of claim 1, wherein the user device-identifier is an International Mobile Subscriber Identity (IMSI) that is assigned to the user device by the wireless access network.

8. The method of claim 1, wherein determining whether to grant access to the at least one telecommunications service or application is further based on a validation of the user device identifier and an additional login credential.

9. The method of claim 8, further comprising:

delegating the validation of the user device identifier and the additional login credential to a third party that is unaffiliated with the communications network.

10. A system, comprising:

one or more processors; and memory having instructions stored therein, the instructions, when executed by the one or more processors, cause the one or more processors to implement components comprising:

an access component configured to receive, from a user device, a request to access a telecommunications service or application, the telecommunications service or application being accessible through a user account that is protected by account credentials, the access component further configured to determine whether to grant the user device access to the telecommunications service or application at the user device based at least on an access identifier that is determined by the access component, the access identifier being associated with a user device identifier provided with the request, the access identifier further being used by the access component instead of the account credentials of the user account to determine whether to grant the user device access, the access identifier being different from the account credentials, the user device identifier being assigned to the user device by a wireless access network that provides cellular communication services to multiple user devices; and a service routing component configured to route the telecommunications service or application to the user device in response to the access identifier being validated by the access component.

11. The system of claim 10, wherein the service routing component is further configured to route the telecommunications service or application based on a user profile, the user profile storing at least one of multiple mobile telecommunications network carrier subscription identifiers, a device identifier of the user device, or user identification information associated with the user device.

12. The system of claim 11, further comprising a profile filter component that filters user information in the user profile that is provided to an application for the application to access a service from the user device, the user information being filtered by the profile filter component in response to an application level of the application that indicates whether the application is a background application installed on the user device, is preapproved for use on the user device, or an unapproved application that is downloaded from a network application store.

13. The system of claim 10, wherein the access component is further configured to determine whether to grant the user device access to the telecommunications service or application based on an additional login credential that is requested in response to a risk analysis.

14. The system of claim 10, wherein the access component is further configured to automatically populate a user authentication interface with identification information from a user profile associated with the user device, the user authentication interface being used by the access component to request additional login credential for determining whether to grant the user device access to the telecommunications service or application.

15. The system of claim 10, wherein the access component is further configured to provide an access credential to a user device in response to determining that the user device is granted access to the telecommunications service or application at the user device, the access credential being used by one or more applications on the user device as an authenticator for accessing the telecommunications service or application.

16. A user device, comprising:

one or more processors; and memory having instructions stored therein, the instructions, when executed by the one or more processors, cause the one or more processors to implement components comprising:

a plurality of client applications, each client application configured to communicate with a corresponding service provider for providing a corresponding service of a plurality of telecommunications services or applications at the user device, the plurality of telecommunications services or applications being accessible using account credentials of a corresponding user for the plurality of telecommunications services or applications;

a device agent configured to provide multiple access identifiers that identify multiple users that are concurrently logged onto the user device to an access management controller;

the access management controller configured to determine whether to grant each user of the multiple users access to one or more telecommunications services or applications based at least on a corresponding access identifier instead of corresponding account credentials;

the device agent further configured to route telecommunications services to a user of the multiple users that is logged into the user device based on whether the telecommunication services is for an access identifier of the user; and the access management controller further configured to access a portion of a user profile associated with the user following a determination that the user is granted access to the one or more telecommunications services or applications, the portion of the user profile being less than an entirety of the user profile.

17. The user device of claim 16, wherein the device agent is further configured to collect information regarding the user from the user device for delivery to the access management controller, the access management controller further configured to store the information in the user profile of the user.

18. The user device of claim 17, wherein the user profile is used to route one or more telecommunications services to at least one application on the user device.

19. The user device of claim 16, wherein device agent is further configured to receive an access credential for the access management controller, the access credential being used by one or more client applications on the user device as an authenticator for accessing the plurality of telecommunications services or applications from a plurality of service providers.

20. The user device of claim 16, wherein the access identifier is one of a telephone number assigned to a user of the multiple users or a user identifier of the user.

* * * * *